(12) United States Patent
Brown et al.

(10) Patent No.: US 10,412,903 B2
(45) Date of Patent: Sep. 17, 2019

(54) DOUBLE-WALLED HOLDER AND INSERT

(71) Applicants: Nicole Brown, Casper, WY (US); Janet Fivecoat-Asbury, Casper, WY (US)

(72) Inventors: Nicole Brown, Casper, WY (US); Janet Fivecoat-Asbury, Casper, WY (US)

( * ) Notice: Subject to any disclaimer, the term of this patent is extended or adjusted under 35 U.S.C. 154(b) by 109 days.

(21) Appl. No.: 15/226,862

(22) Filed: Aug. 2, 2016

(65) Prior Publication Data

US 2018/0035618 A1   Feb. 8, 2018

(51) Int. Cl.
| *A01G 9/02* | (2018.01) |
| *B65D 25/02* | (2006.01) |
| *B65D 25/54* | (2006.01) |
| *A01G 24/00* | (2018.01) |
| *A01G 9/00* | (2018.01) |

(52) U.S. Cl.
CPC ............... *A01G 9/02* (2013.01); *A01G 9/006* (2013.01); *A01G 24/00* (2018.02); *B65D 25/02* (2013.01); *B65D 25/54* (2013.01)

(58) Field of Classification Search
CPC ................................ A01G 9/02; A01G 9/1086
USPC .................................................. 47/65.7, 66.6
See application file for complete search history.

(56) References Cited

U.S. PATENT DOCUMENTS

| D50,329 S | * | 2/1917 | White ............................... 47/67 |
| 2,362,846 A | * | 11/1944 | O'Brien ................... B65D 7/36<br>220/277 |
| 2,492,152 A | * | 12/1949 | Hollowell ............... A01G 27/00<br>211/85.23 |
| 2,604,579 A | * | 7/1952 | Deneboudes ...... A47G 23/0241<br>362/101 |
| 4,001,959 A | * | 1/1977 | Grendahl ............. A47G 1/0616<br>40/506 |
| 4,014,506 A | | 3/1977 | Hanson |
| 4,646,209 A | * | 2/1987 | Jansen .................... A47G 7/041<br>362/122 |
| 4,928,412 A | * | 5/1990 | Nishiyama ......... A47G 19/2227<br>40/324 |
| 5,036,998 A | * | 8/1991 | Dunn ..................... A47G 19/30<br>220/23.87 |
| 5,044,120 A | * | 9/1991 | Couch ...................... A01G 9/02<br>47/73 |
| 5,329,728 A | * | 7/1994 | Ray ........................ A47G 7/047<br>24/555 |
| 5,491,928 A | * | 2/1996 | Potochnik .............. A01G 27/00<br>215/332 |
| 5,553,735 A | * | 9/1996 | Kimura .............. A47G 19/2227<br>220/62.18 |
| 5,695,160 A | | 12/1997 | Cockrum |
| 5,735,075 A | | 4/1998 | Honkawa |
| 5,870,856 A | | 2/1999 | Friend |
| 5,894,948 A | * | 4/1999 | Yeh .................... A47G 19/2227<br>215/12.1 |
| D432,944 S | * | 10/2000 | Harris ......................... D11/148 |

(Continued)

*Primary Examiner* — Tien Q Dinh
*Assistant Examiner* — Ebony E Evans
(74) *Attorney, Agent, or Firm* — Peter J Tumbers

(57) ABSTRACT

A double walled holder is provided. The double-walled holder provides a floor and walls capable of attachment of various hooks to the walls of the holder. The double-walled holder has an interior cavity to receive an insert. The double-walled holder holds images and momentoes as well as receiving an insert capable of holding a plant.

12 Claims, 9 Drawing Sheets

(56) References Cited

U.S. PATENT DOCUMENTS

| | | | |
|---|---|---|---|
| 6,325,211 B1 | 12/2001 | Greiner | |
| 6,374,540 B1 | 4/2002 | Garcia | |
| 6,505,440 B1 | 1/2003 | Lai | |
| 6,581,328 B2 * | 6/2003 | LaMear | A47G 7/06 206/423 |
| 6,716,026 B1 * | 4/2004 | Beougher | F21V 35/00 431/290 |
| 6,962,264 B2 * | 11/2005 | Zilberman | A47G 19/2227 220/662 |
| D532,334 S * | 11/2006 | Smith | D11/144 |
| 7,322,300 B2 * | 1/2008 | Caeton | A47B 13/088 108/50.12 |
| 7,673,753 B1 * | 3/2010 | Huckert | A47G 19/025 206/459.1 |
| 7,735,260 B2 * | 6/2010 | Holliday | A47G 7/047 47/66.4 |
| D630,123 S * | 1/2011 | Ott | D11/144 |
| 2003/0036028 A1 * | 2/2003 | Pesu | C11C 5/006 431/35 |
| 2007/0248922 A1 * | 10/2007 | Mahdavieh | F23D 3/16 431/291 |

* cited by examiner

DOUBLE-WALLED HOLDER AND INSERT

FIELD OF THE INVENTION

This invention relates generally to a walled holder containment apparatus to provide a means to quickly, easily and inexpensively alter the appearance and decorate a potted plant contained in an insert.

BACKGROUND OF THE INVENTION

Plant owners and plant enthusiasts own planters which contain plants that are displayed. Often plant owners and plant enthusiasts wish to decorate the outside of a planter containing a plant. It is necessary either to paint or paste images to the outside of the planter. Unfortunately, this damages the planter and possibly ruins the image that is attached to the planter.

Additionally, plant owners and plant enthusiasts are not able to easily, quickly or inexpensively alter the outside of the planters containing the plants. Plant owners and plant enthusiasts are forced to maintain one decoration of the planter for long periods of time.

It is desirable to be able to alter the decorative features of the planters. Thus, there is a long felt need to provide a means to alter the outer appearance of the planters containing plants.

SUMMARY OF THE INVENTION

Accordingly, it is an object of embodiments of the present invention to provide a double-walled holder adaptable to receive an insert and hang momentoes and keepsakes protected and visible around the outside of the planter.

Additional objects, advantages and novel features of the invention will be set forth in pan in the description which follows, and in part will become apparent to those skilled in the art upon examination of the following or may be learned by practice of the invention. The objects and advantages of the invention may be realized and attained by means of the instrumentalities and combinations particularly pointed out in the appended claims. To achieve the foregoing and other objects, and in accordance with the purposes of the present invention, as embodied and broadly described herein, the planter is presented herein. The double-walled holder apparatus, said double-walled holder comprising an inner wall, an outer wall, a floor between the inner wall and the outer wall and a void space between said inner wall and said outer wall and above the floor, said floor comprising a bottom surface and a top surface adapted for contact with said inner wall and said outer wall, said inner wall comprising an inner wall top portion, an inner wall bottom portion, an inner wall interior surface and an inner wall exterior surface, said inner wall interior surface forming a cavity, said outer wall comprising an outer wall top portion, an outer wall bottom portion, an outer wall interior surface and an outer wall exterior surface, said outer wall at least partially comprised of a transparent material.

It is further contemplated within the context of the invention that the planter further comprises a double-walled holder and insert apparatus, said double-walled bolder comprising an inner wall, an outer wall, a floor between said inner wall and said outer wall and a void space between said inner wall and said outer wall and above the floor, said floor comprising a bottom surface and a top surface adapted for contact with said inner wall and said outer wall, said inner wall comprising an inner wall top portion, an inner wall bottom portion, an inner wall interior surface and an inner wall exterior surface, said inner wall interior surface forming a cavity adapted to receive said insert, said outer wall comprising an outer wall top portion, an outer wall bottom portion, an outer wall interior surface and an outer wall exterior surface, an outer wall horizontal ledge attached to the top portion of said outer wall and said ledge extending outward away from the top portion of said inner wall, said outer wall at least partially comprised of a transparent material, said insert comprises an insert bottom, an insert wall, an insert wall top portion, an insert ledge horizontally extending outward and adapted to contact said top portion of said outer wall and said outer wall horizontal ledge, an insert interior surface and an insert exterior surface, said insert interior surface adapted to receive soil.

Benefits and advantages of the present invention include, but are not limited to, providing double-walled holder with insert, which provides a means to display photographs, momentoes, keepsakes, knickknacks and other articles surrounding an insert capable of receiving a plant and soil.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
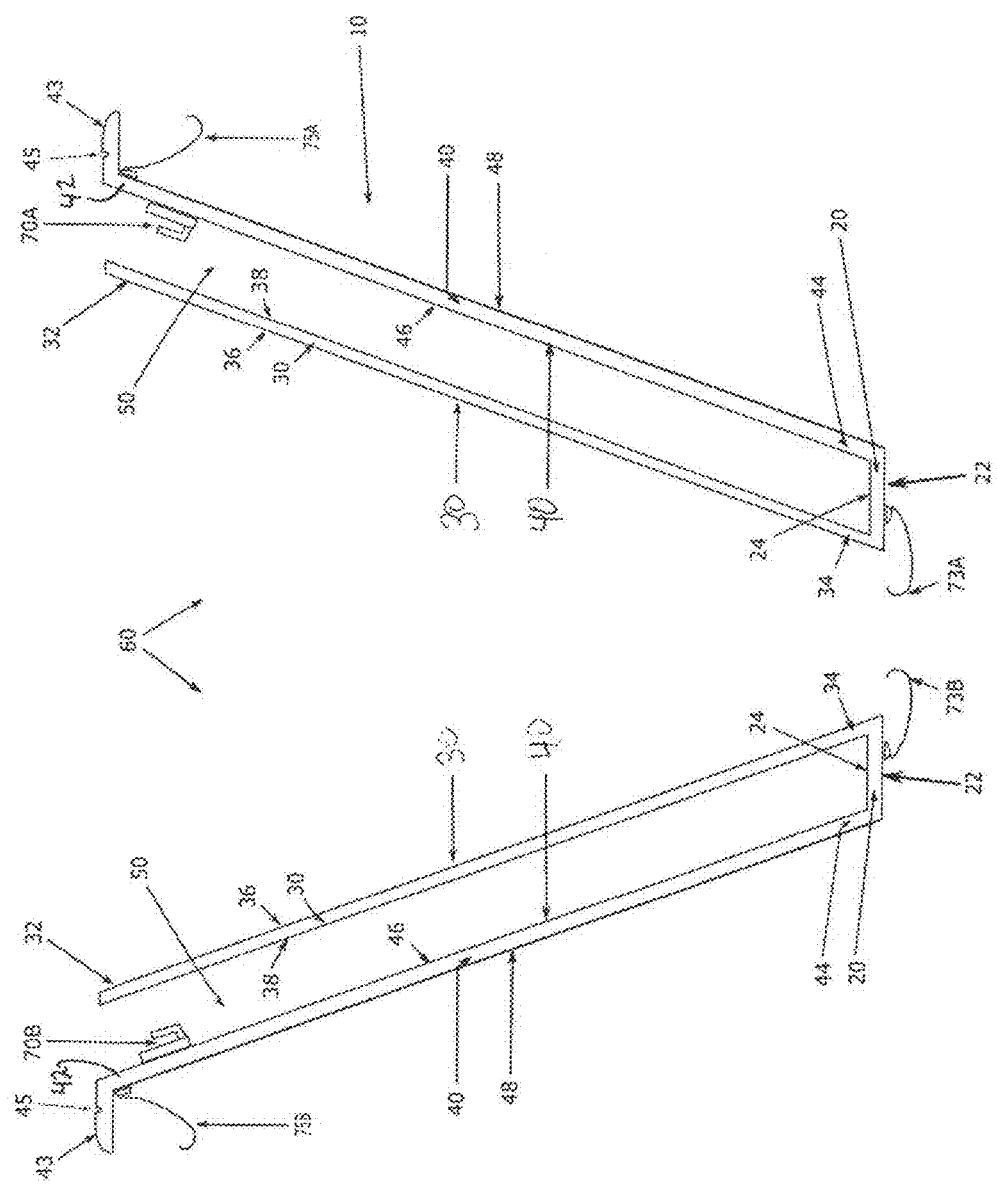
FIG. 1 is a side cross-sectional slice view of one embodiment of the instant invention.

Reference will now be made in detail to embodiments of the invention, examples of which are illustrated in the accompanying drawings. Throughout the following detailed description, the same reference characters refer to the same or similar elements in all figures.

FIG. 1 shows a planar side cross-sectional slice view of one embodiment of the present invention a double-walled holder 10 having a floor 20, an inner wall 30, an outer wall 40 and a void space 50 between the inner wall 30 and the outer wall 40. The floor 20 has a floor bottom surface 22 and a floor top surface 24. The floor top surface 24 contacts and is disposed between the inner wall 30 and the outer wall 40. The inner wall 30 has an inner wall top portion 32, an inner wall bottom portion 34, an inner wall interior surface 36 and an inner wall exterior surface 38. Tire inner wall interior surface 36 forms a cavity 60 adapted for receiving an insert, which would hold a plant in many embodiments (not depicted in FIG. 1). The outer wall 40 has an outer wall top portion 42, an outer wall bottom portion 44, an outer wall interior surface 46 and an outer wall exterior surface 48. The outer wall interior surface 46, the floor top surface 24 of the floor 20 and the inner wall exterior surface 38 form a void space 50. In one embodiment of the instant invention the outer wall 40 is at least partially comprised of transparent material. In another embodiment of the instant invention, the inner wall 30 is at least partially comprised of transparent material. In yet, another embodiment of the instant invention, both the inner and outer walls are at least partially comprised of transparent material.

FIG. 1 depicts void space hook 70A and void space hook 70B attached to the interior surface 46 of the outer wall 40. In other embodiments, the void space hooks are attached to the exterior surface 38 of the inner wall 30. FIG. 1 also depicts floor hook 73A and floor hook 73B attached to the floor bottom surface 22. The floor hooks provide attachment of the double walled holder to the not depicted insert planter not depicted in FIG. 1. In FIG. 1, the outer wall top portion depicts top hook 75A and top hook 75B attached to the exterior surface 48 of the outer wall 40. The top hooks provide secure attachment lo the planter insert, not depicted.

FIG. 1 depicts an outer wall horizontal ledge 43 attached to the outer wall top portion 42 of said outer wall 40. The outer wall horizontal ledge 43 extends outward and away from the inner wall top portion 32. FIG. 1 also depicts a channel 45 on the top surface of the horizontal ledge 43. The channel 45 is adapted to receive a gasket (not depicted), which allows for the void space 50 to be air tight when a lidded planter insert (not depleted in FIG. 1) is placed on top of the horizontal ledge 43 and top portion 42 of the outer wall 40 of the double-walled holder 10. In some embodiments of the instant invention the horizontal ledge portion 43 slants downward from the top portion 42 of the outer wall 40.

Figure 2:
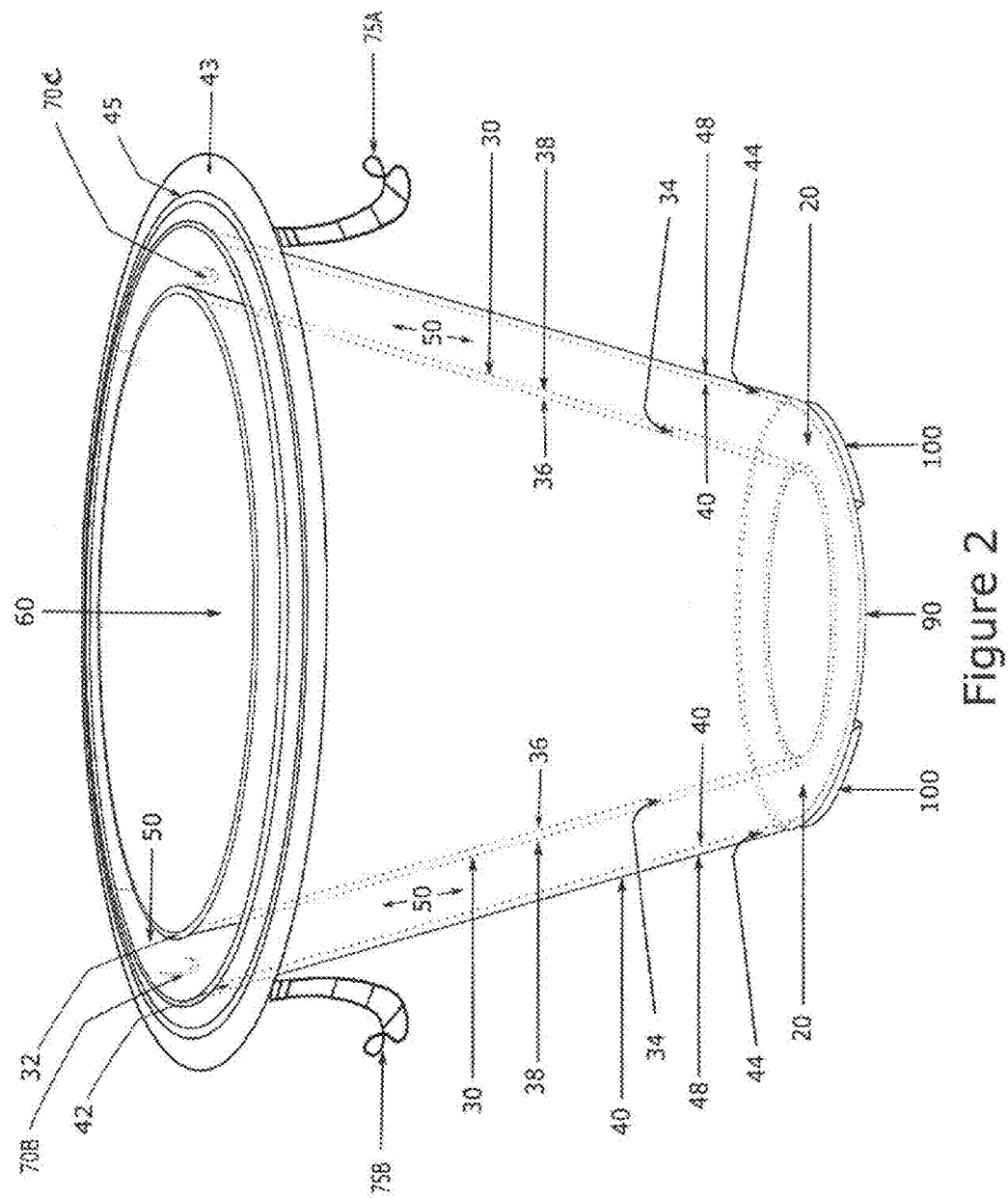
FIG. 2 is a top side perspective view of one embodiment of the instant invention.

FIG. 2 depicts is a perspective top side view of another embodiment of the present invention. In FIG. 2, the void space hook 70C is attached to the exterior surface 38 of the inner wall 30 and void space hook 70B attached to the outer wall interior surface. In other embodiments, not depicted, the void space hooks are attached to only the exterior surface 38 of the inner wall. In still other embodiments the void space hooks are attached to only interior surface of the outer wall.

Figure 3:
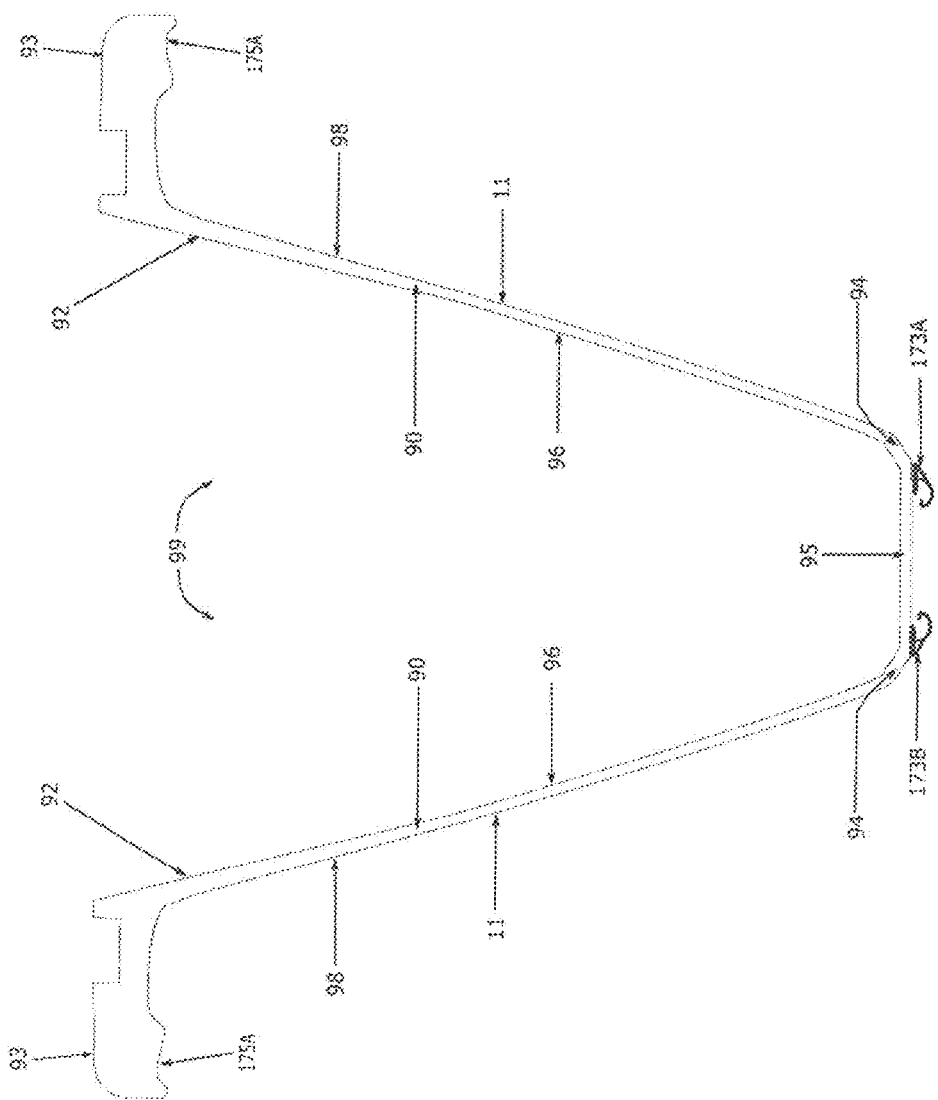
FIG. 3 is a side view of one embodiment of the instant invention.

FIG. 3 depicts an insert 90 with a void cavity 99 to be filled with a plant and soil for the plant (not depicted). The insert 90 has an insert top portion 92, an insert bottom portion 94, and an insert interior surface 96, which makes contact with soil and plant matter (not depicted). The insert 90 has an insert exterior surface 98 that is disposed next to the inner wall interior surface in the void space of the double-walled holder (not depicted). The insert 90 has an insert outer ledge 93 attached to the insert top portion 92. The insert outer ledge 93 is adapted to contact the outer wall top portion and make contact with the top surface of the horizontal ledge and gasket disposed in the channel 45. FIG. 3 also depicts insert receiver hook 173A and insert receiver hook 173B adapted to receive the floor hook 73A and 73B (not depicted), respectively. FIG. 3 also depicts the insert bottom 95, which attaches to the insert wall 11. Insert 90 also has an insert top hook receiver groove 175A adapted for attachment of the lop hooks attached to the upper portion of the outer wall (not depicted).

Figure 4:
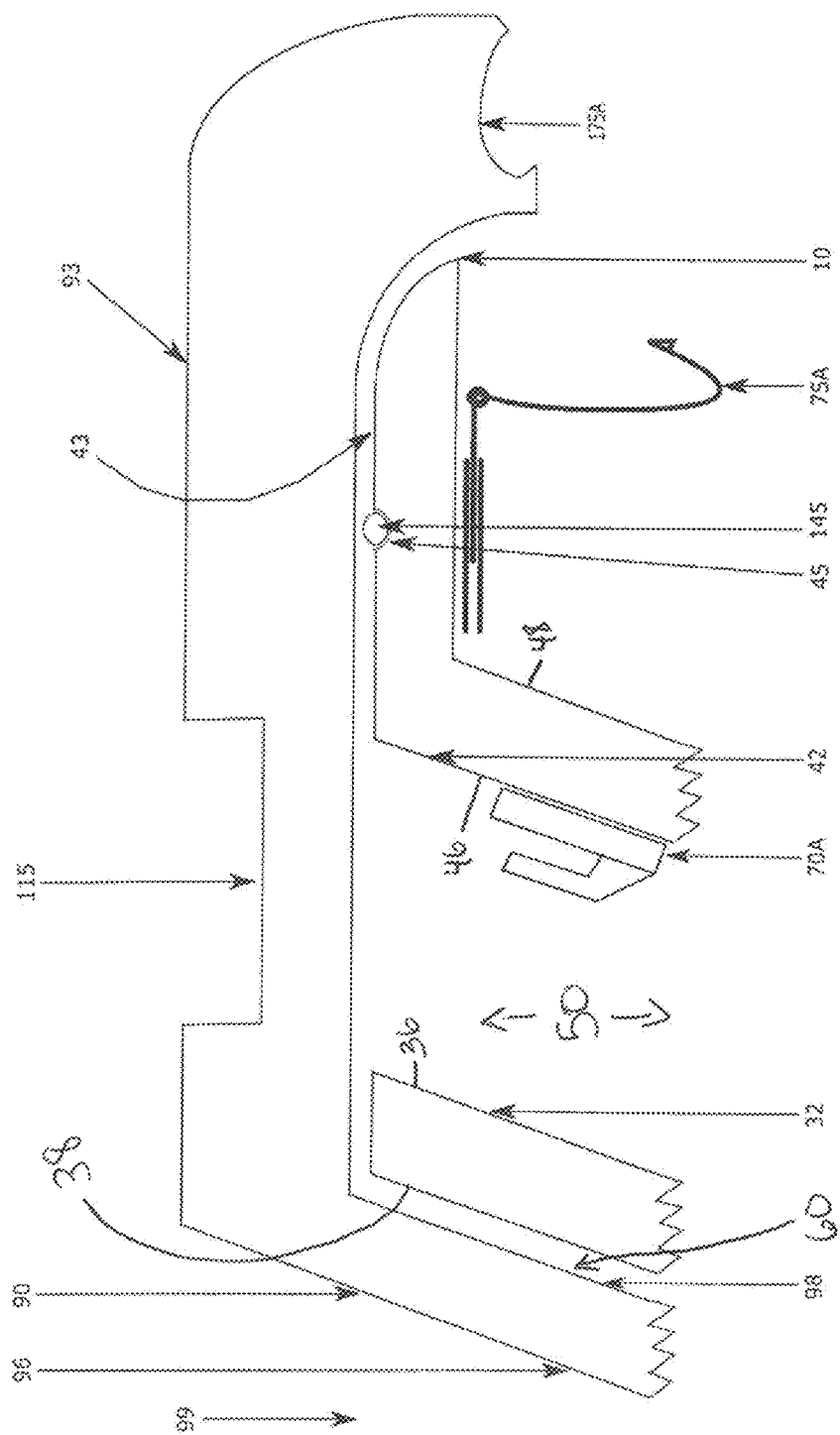
FIG. 4 is a side view of the upper portion of one embodiment of the instant invention.

FIG. 4 is a side planar depicts the top portions of the insert and the top portions of double-walled container as the insert is partially disposed in the cavity 60. The insert top hook receiver groove 175A is adapted to receive the top hook 75A attached to bottom portion of the horizontal ledge 43. Also depicted in FIG. 4 is a gasket 145 in the channel 45. When the insert is fully disposed, the bottom surface of the insert outer ledge 93 would form an airtight void space 50. This airtight void space aids in preservation of the items placed in the void space 50.

Figure 5:
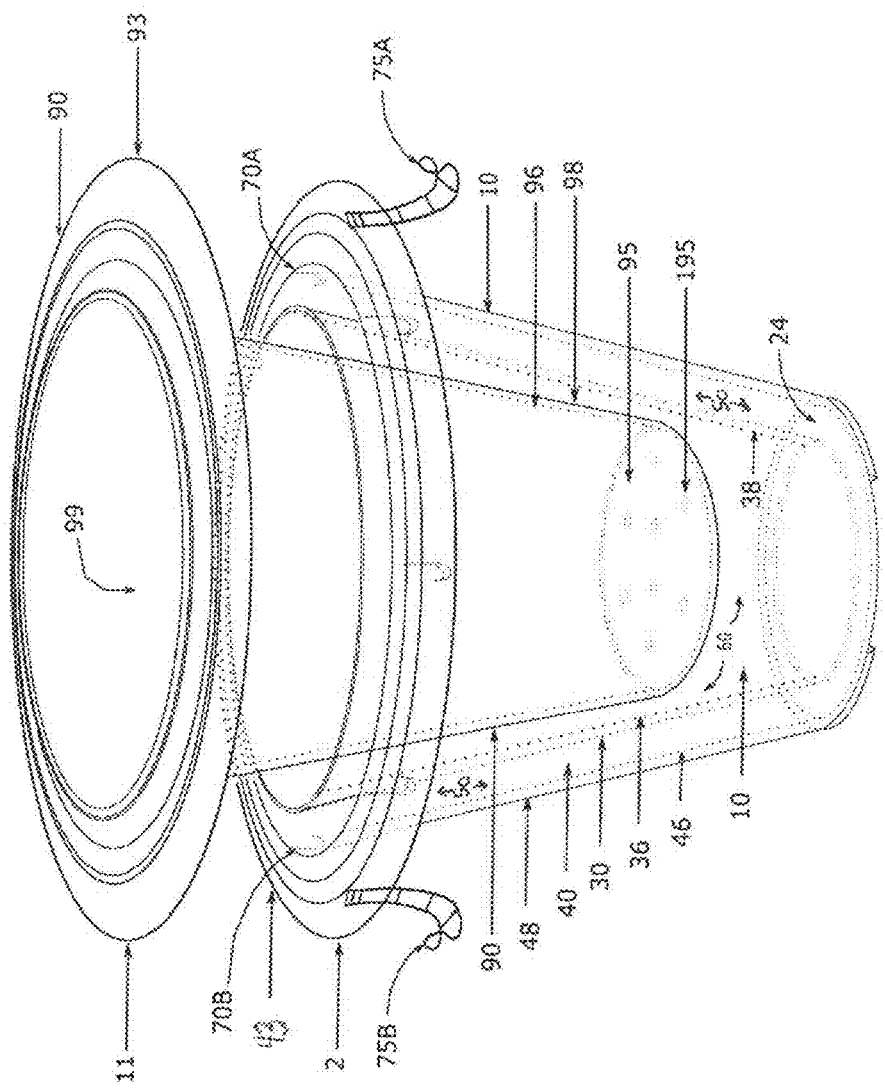
FIG. 5 is a top side perspective view of one embodiment of the instant invention.

FIG. 5 depicts a perspective side view of a partial insertion of the insert 90 into the double-walled holder 10. In this depicted embodiment, the top hook 75A and top hook 75B slide over the insert outer ledge 93 once the insert 90 is fully inserted into the double-walled holder 10. Additionally, the insert bottom 95 has multiple insert perforations 195 to provide removal of excess water that may be deposited in the insert void cavity 99.

Figure 6:
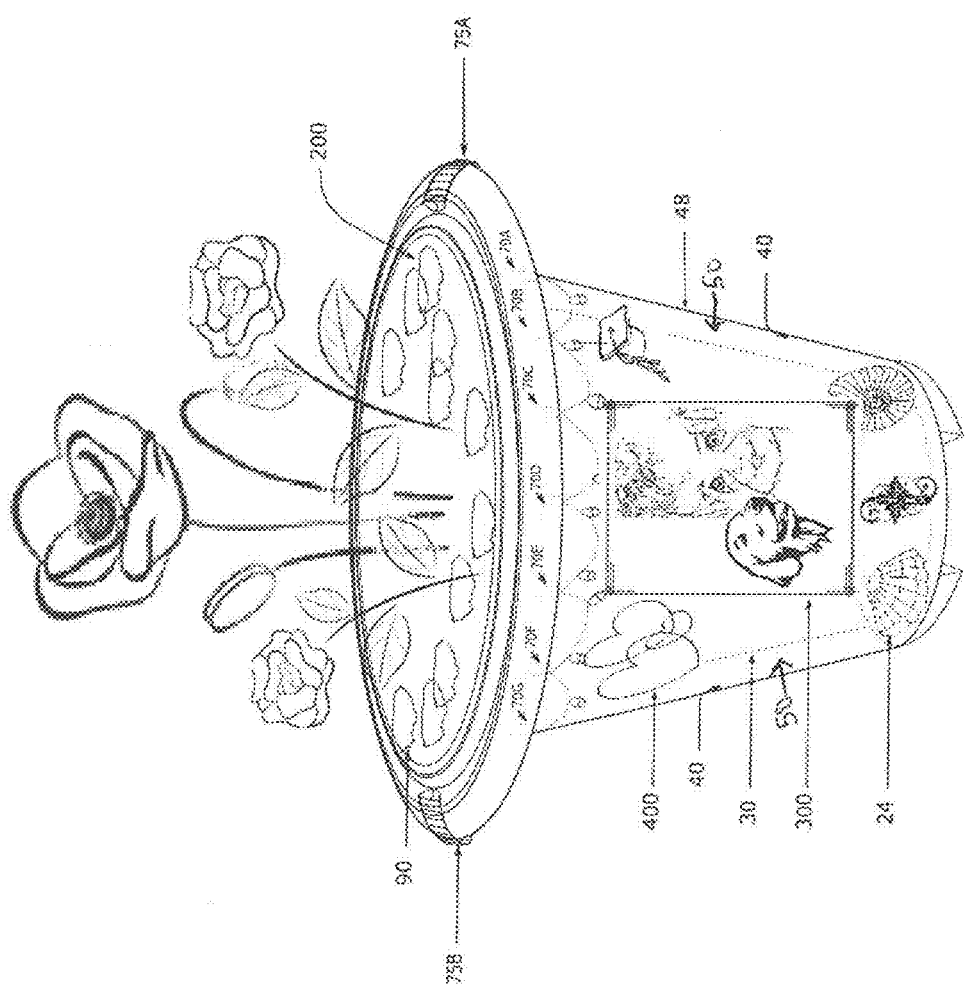
FIG. 6 is a perspective top side view of one embodiment of the instant invention.

FIG. 6 depicts an insert 90 having plant material 200 disposed into the insert void cavity. The insert 90 is disposed in the double-walled container. The top hook 75A and top hook 75B are attached to the insert 90, holding it in place. Photograph 300 and momentoes 400 arc disposed in said void space 50. The photograph 300 and momentoes 400 are attached to clips that are held up by a chain which is attached to void space hooks 70A, 70B, 70C, 70D, 70E, 70F and 70G. FIG. 6 depicts other trinkets at the bottom of the void space 50. The void space 50 is depicted as clear.

Figure 7:
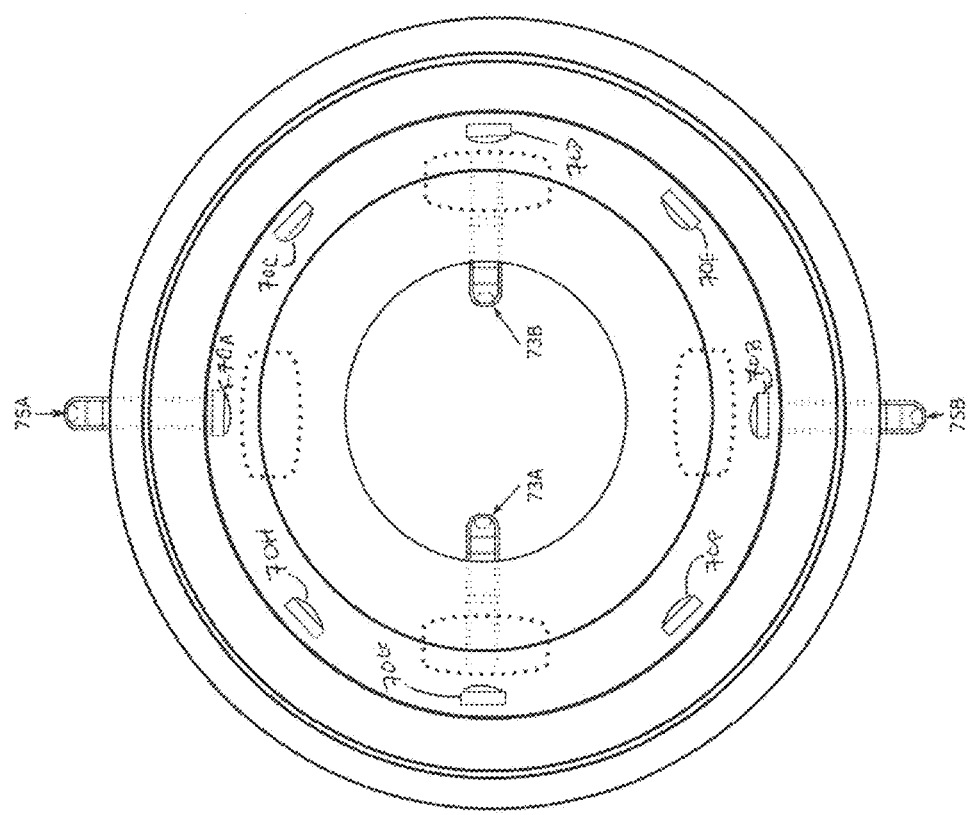
FIG. 7 is a top planar view of a circular embodiment of tire instant invention.

FIG. 7 depicts a top down view of one embodiment of the instant invention, in the form of a circular double-walled holder, with top hooks 75A and 75B and floor hooks 73A and 73B. FIG. 7 depicts the circular double walled container with void space hooks 70A, 70B, 70C, 70D, 70E, 70F, 70G and 70H attached to the outer wall 40.

While FIGS. 1-7 have shown and contemplated circular embodiments of the instant invention, it is further contemplated within the scope of this invention that the double-walled holder and insert comprises other shapes, including, but not limited to oval, triangle, square, rectangle, pentagon, hexagon, heptagon, octagon, nonagon and decagon.

Figure 8:
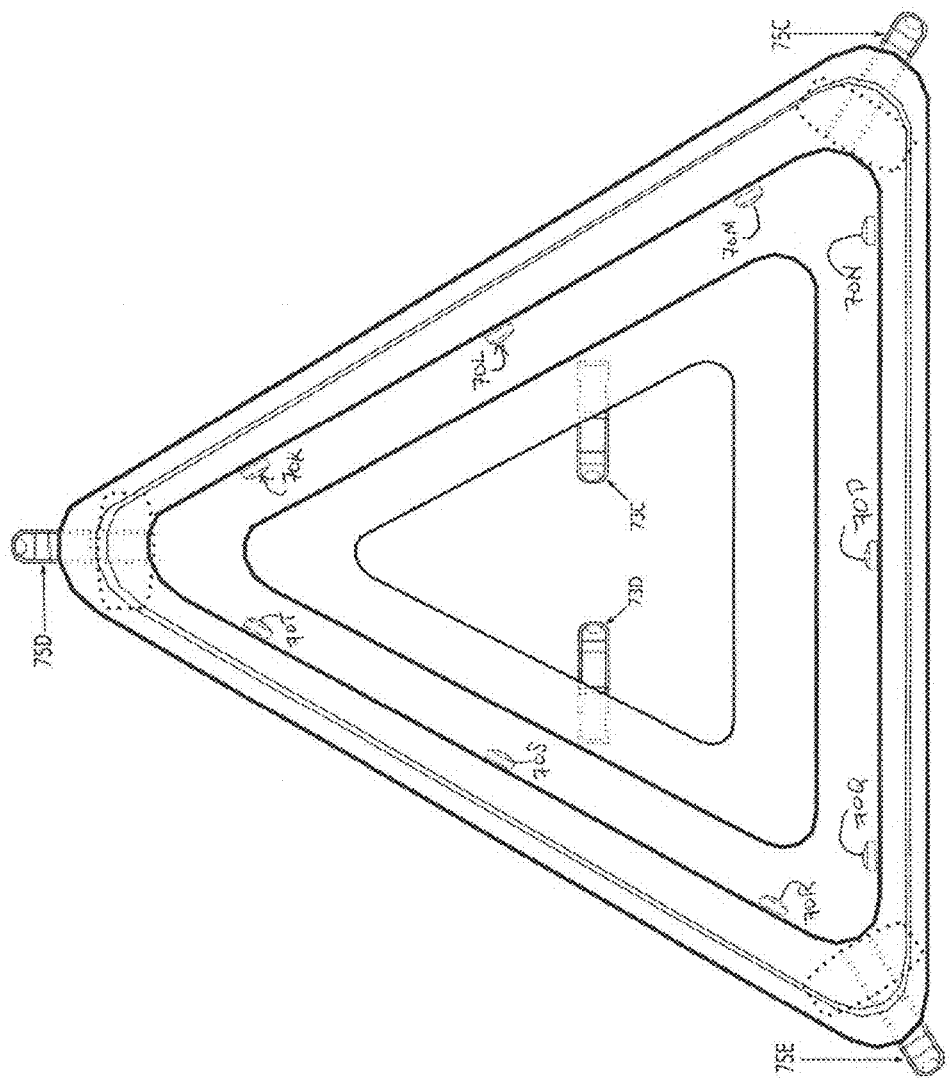
FIG. 8 is a top planar view of a triangular-shaped embodiment of the instant invention.

FIG. 8 depicts a triangular double walled container with void space hooks 70K, 70L, 70M, 70N, 70P, 70Q, 70R, 70S and 70T. The top hooks 75C, 75D and 75E and the floor hooks 73C and 73D attach to a triangular insert (not depicted).

Figure 9:
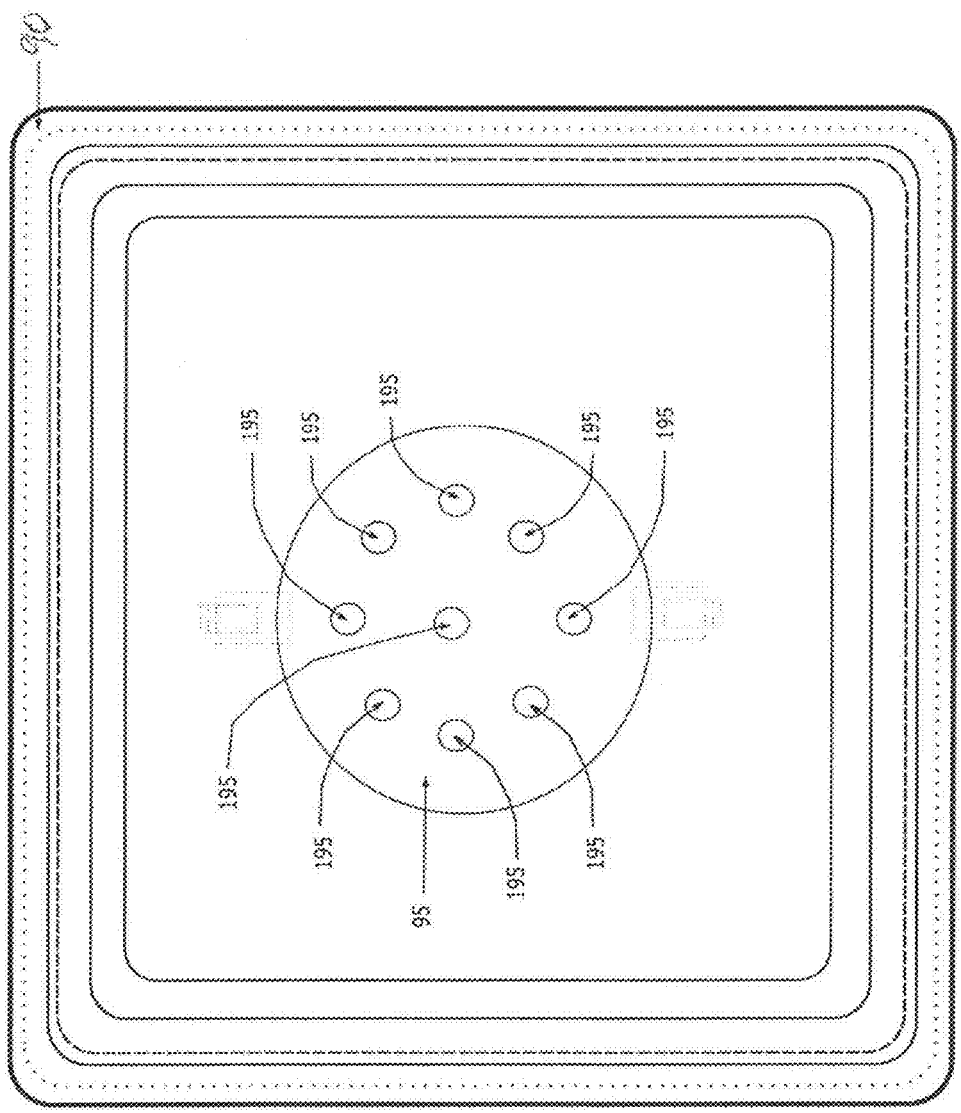
FIG. 9 is a top planar view of a square-shaped embodiment of the instant invention.

FIG. 9 depicts the double-walled holder and insert disposal inside. The insert bottom 95 has multiple insert perforations 195.

The planter inner wall, outer wall, base and insert all may be at least partially comprised of a transparent material selected from the group consisting of plexiglass, glass, plastics, transparent urethane, transparent polyurethane and transparent polymers.

It is believed that the apparatus of the present invention and many of its attendant advantages will be understood from the foregoing description. It is also believed that it will be apparent that various changes may be made in the form, geometry, construction, and arrangement of the components without departing from the scope and spirit of the invention and without sacrificing its material advantages. The forms described are merely exemplary and explanatory embodiments thereof. It is the intention of the following claims to encompass and include such changes.

What is claimed is:

1. A double-walled holder and insert apparatus, said double-walled holder comprising an inner wall, an outer wall, a floor between the inner wall and the outer wall and a void space between said inner wall and said outer wall and above the floor, said floor comprising a bottom surface and a top surface adapted for contact with said inner wall and said outer wall only and said inner wall not providing contact with said insert, said inner wall comprising an inner wall top portion, an inner wall bottom portion, an inner wall interior surface and an inner wall exterior surface, said inner wall interior surface forming a cavity, said outer wall comprising an outer wall top portion, an outer wall bottom portion, an outer wall interior surface and an outer wall exterior surface, said outer wall top portion comprising an outer wall horizontal ledge attached to the top portion of said outer wall and said ledge extending outward away from the top portion of said inner wall, said outer wall at least partially comprised of a transparent material, said insert disposed in said cavity and said insert comprising an insert bottom having insert perforations, an insert wall, an insert wall top portion, an insert interior surface, an insert exterior surface, and an insert outer ledge horizontally attached to said insert wall top portion and extending outward, over and beyond said inner wall top portion, said insert outer ledge adapted to contact said top portion of said outer wall and said outer wall horizontal ledge, said insert outer ledge extending beyond said outer wall outer horizontal ledge, at least one hook attached to the bottom surface of the floor of the double walled holder and attachable to the insert bottom.

2. The double-walled holder and insert apparatus of claim 1, further comprising a void space hook attached to the said inner wall exterior surface between said inner wall top portion and said inner wall bottom portion.

3. The double-walled holder and insert apparatus of claim 2, further comprising a second void space hook attached to said inner wall exterior surface between said inner wall top portion and said inner wall bottom portion.

4. The double-walled holder and insert apparatus of claim 3, further comprising a chain attached to and extended between said void space hooks.

5. The double-walled holder and insert apparatus of claim 4, further comprising a photograph attached to the chain.

6. The double-walled holder and insert apparatus of claim 2, further comprising another void space hook attached to said outer wall interior surface between said outer wall top portion and said outer wall bottom portion.

7. The double-walled holder and insert apparatus of claim 2, further comprising a photograph attached to said void space hook.

8. The double-walled holder and insert apparatus of claim 1, further comprising at least one void space hook attached to said outer wall interior surface.

9. The double-walled holder and insert apparatus of claim 8, further comprising at least one more void space hook attached to said outer wall interior surface between said outer wall top portion and said outer wall bottom portion.

10. The double-walled holder and insert apparatus of claim 9, further comprising a chain attached to and extended between said at least one void space hook and said at least one more void space hook.

11. The double-walled holder and insert apparatus of claim 10, further comprising a photograph attached to the chain.

12. The double-walled holder and insert apparatus of claim 8, further comprising an at least one photograph attached to said at least one void space hook.

* * * * *